United States Patent
Gopalan et al.

(10) Patent No.: US 8,968,559 B2
(45) Date of Patent: Mar. 3, 2015

(54) BIODEGRADABLE DISPOSABLE DEBRIS BAG

(75) Inventors: Suresh Cherulassery Gopalan, Cary, NC (US); Brian S. King, Apex, NC (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 577 days.

(21) Appl. No.: 12/780,616

(22) Filed: May 14, 2010

(65) Prior Publication Data

US 2011/0278210 A1 Nov. 17, 2011

(51) Int. Cl.
*E04H 4/16* (2006.01)

(52) U.S. Cl.
CPC ..................... *E04H 4/1654* (2013.01)
USPC .......... 210/167.17; 210/232; 210/448; 15/1.7

(58) Field of Classification Search
USPC .......................... 210/167.17, 232, 448; 15/1.7
See application file for complete search history.

(56) References Cited

U.S. PATENT DOCUMENTS

| | | |
|---|---|---|
| 1,383,615 A | 7/1921 | Geier |
| 2,421,067 A | 5/1947 | Howe |
| 2,698,639 A | 1/1955 | Bottomley |
| 2,853,309 A | 7/1958 | Wheeler |
| 3,176,450 A | 4/1965 | Weinstein |
| 3,912,140 A | 10/1975 | Franges |
| 3,932,281 A | 1/1976 | Pansini |
| 3,972,339 A * | 8/1976 | Henkin et al. ............ 134/168 R |
| 4,040,864 A | 8/1977 | Steeves |
| 4,140,163 A | 2/1979 | Usner |
| 4,296,529 A | 10/1981 | Brown |
| 4,575,423 A | 3/1986 | Alanis et al. |
| 4,589,986 A | 5/1986 | Greskovics et al. |
| 4,618,420 A | 10/1986 | Alanis |
| 4,776,954 A | 10/1988 | Brooks |
| 4,778,599 A | 10/1988 | Brooks |
| 4,839,063 A | 6/1989 | Brooks |
| 4,856,913 A | 8/1989 | Campbell |
| 4,880,531 A | 11/1989 | Blake et al. |
| 5,003,758 A | 4/1991 | Bernstein |
| 5,031,277 A | 7/1991 | Coker |
| 5,088,667 A | 2/1992 | Olson |
| 5,336,403 A | 8/1994 | Marbach |
| 5,417,495 A | 5/1995 | Branson |
| 5,536,397 A | 7/1996 | D'Offay |

(Continued)

FOREIGN PATENT DOCUMENTS

| | | |
|---|---|---|
| DE | 10159354 | 11/2002 |
| GB | 2420116 | 5/2006 |

(Continued)

OTHER PUBLICATIONS

Machine-generated English translation of JP 9-272601. Printed Sep. 2013.*

*Primary Examiner* — Fred Prince
(74) *Attorney, Agent, or Firm* — Quarles & Brady LLP

(57) ABSTRACT

Embodiments of the invention provide a biodegradable, disposable debris bag for a pool cleaner. The debris bag includes biodegradable fabric filtration media stitched together to form an opening capable of being coupled to an outlet of the pool cleaner and a hollow interior portion to capture debris from the pool cleaner. The biodegradable fabric filtration media is folded over and stitched together to create the opening and the hollow interior portion.

19 Claims, 6 Drawing Sheets

(56) References Cited

U.S. PATENT DOCUMENTS

| | | |
|---|---|---|
| D379,693 S | 6/1997 | Campbell et al. |
| 5,760,118 A | 6/1998 | Sinclair et al. |
| 5,863,425 A | 1/1999 | Herlehy et al. |
| D409,341 S | 5/1999 | Van Etten et al. |
| 5,919,359 A | 7/1999 | Bisseker |
| 6,027,641 A | 2/2000 | Spradbury et al. |
| 6,071,322 A | 6/2000 | Hulthen |
| 6,169,045 B1 | 1/2001 | Pike et al. |
| 6,193,885 B1 | 2/2001 | Campbell |
| D438,373 S | 3/2001 | Riley |
| 6,241,899 B1 | 6/2001 | Ramos |
| 6,302,277 B1 | 10/2001 | Resh |
| 6,358,410 B1 | 3/2002 | Lambert |
| D468,067 S | 12/2002 | Stoltz et al. |
| 6,706,175 B1 | 3/2004 | Rief et al. |
| 6,740,233 B2 | 5/2004 | Stoltz et al. |
| 6,786,947 B2 | 9/2004 | Mountford |
| 6,802,963 B2 | 10/2004 | Campbell |
| 6,908,550 B2 | 6/2005 | Silverstein |
| 7,029,583 B2 | 4/2006 | Meritt-Powell |
| 7,208,083 B2 | 4/2007 | Meritt-Powell |
| 7,273,546 B2 | 9/2007 | Meritt-Powell |
| 7,575,675 B2 | 8/2009 | Gopalan |
| 2003/0070980 A1 | 4/2003 | Ray |
| 2004/0007522 A1 * | 1/2004 | Garti .................... 210/483 |
| 2004/0047522 A1 | 3/2004 | Thibault |
| 2005/0029177 A1 | 2/2005 | Peterson, Jr. et al. |
| 2005/0040089 A1 | 2/2005 | Meritt-Powell |
| 2005/0236310 A1 | 10/2005 | Meritt-Powell |
| 2005/0279682 A1 | 12/2005 | Davidson et al. |
| 2008/0124791 A1 | 5/2008 | Bucci |
| 2008/0202997 A1 | 8/2008 | Davidson et al. |
| 2008/0264029 A1 | 10/2008 | Sepaniak |

FOREIGN PATENT DOCUMENTS

| | | |
|---|---|---|
| JP | 9-272601 A * | 10/1997 |
| WO | WO/2005/019565 | 3/2005 |

* cited by examiner

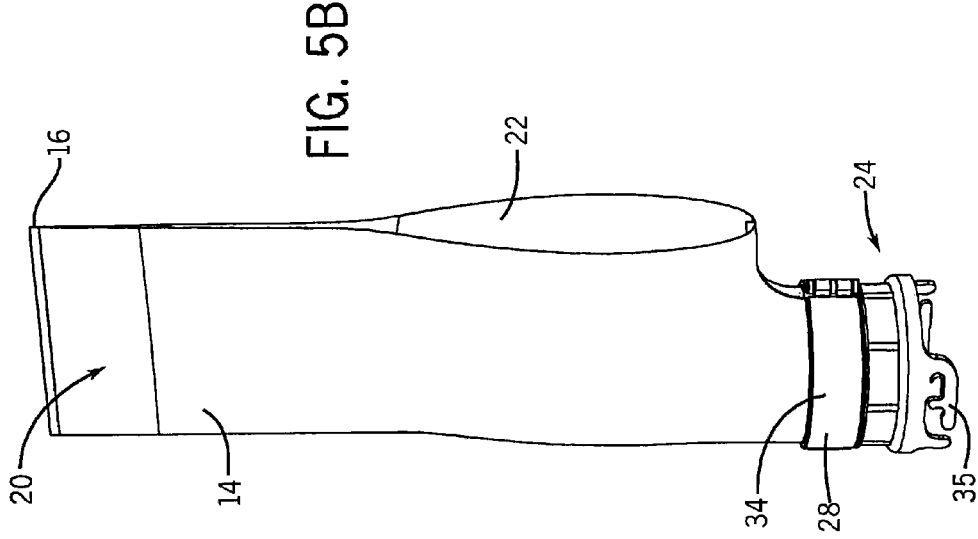
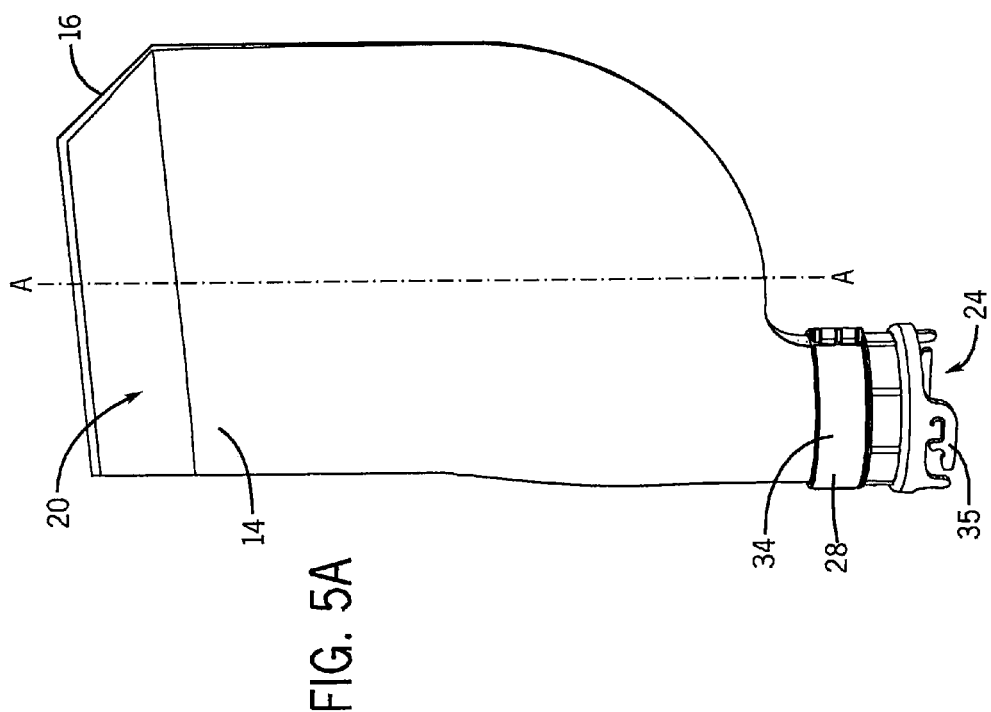

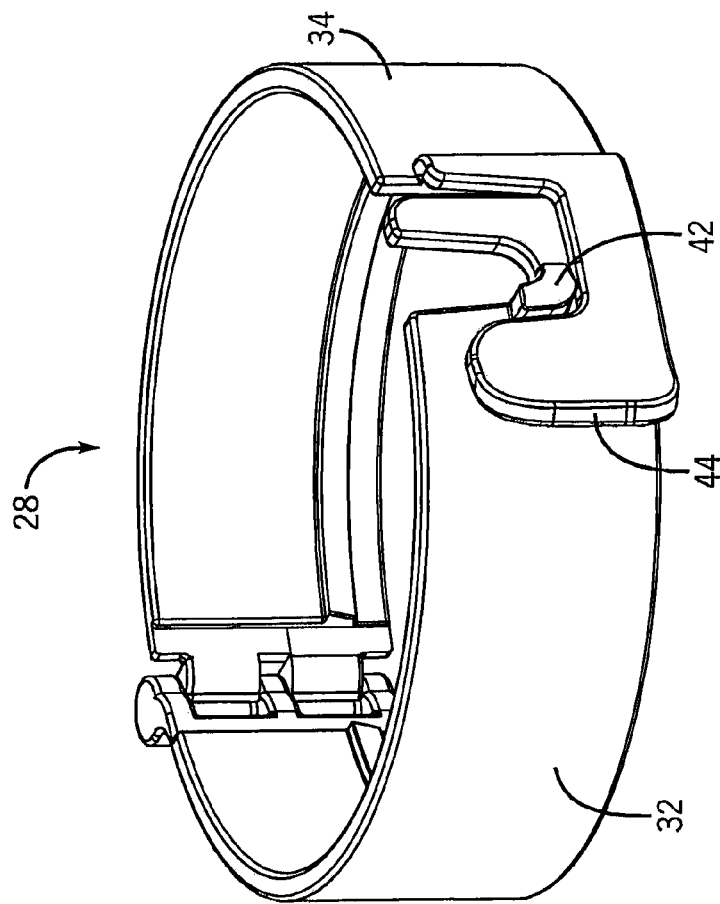
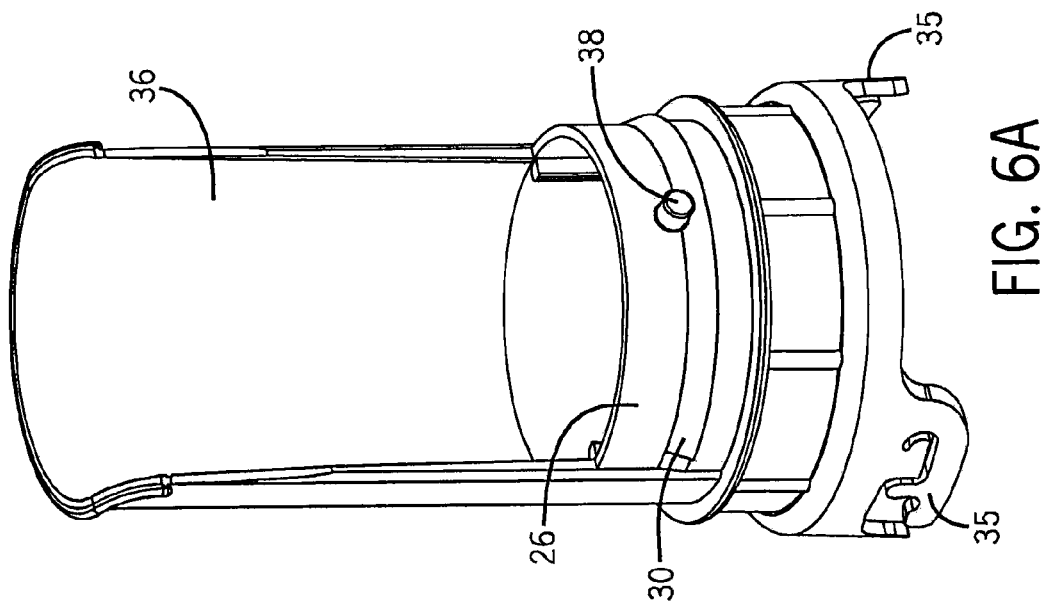
FIG. 6A
FIG. 6B

BIODEGRADABLE DISPOSABLE DEBRIS BAG

BACKGROUND

Pressure-driven pool cleaners include a debris bag to hold captured debris. Conventional debris bags are reusable and must be cleaned out periodically. Cleaning wet reusable debris bags (which can contain anything from leaves to rotten bugs) can be very tedious and can allow some captured debris to spill back into the pool. Compared to reusable debris bags, disposable debris bags can allow users to save a significant amount of time and effort.

SUMMARY

Some embodiments of the invention provide a biodegradable, disposable debris bag for a pool cleaner. The debris bag includes biodegradable fabric filtration media stitched together to form an opening capable of being coupled to an outlet of the pool cleaner and a hollow interior portion to capture debris from the pool cleaner. The biodegradable fabric filtration media is folded over and stitched together to create the opening and the hollow interior portion. In some embodiments, the biodegradable fabric filtration media is a non-woven polylactic acid fabric or a non-woven polyhydroxy butyrate fabric.

DESCRIPTION OF THE DRAWINGS

FIG. 5A is another perspective view of the debris bag of FIG. 1.

FIG. 5B is a cross-sectional perspective view of the debris bag of FIG. 5A split along line A-A.

FIGS. 6A and 6B are perspective views of components of an attachment fixture for use with the debris bag, according to one embodiment of the invention.

DETAILED DESCRIPTION

Figure 1:
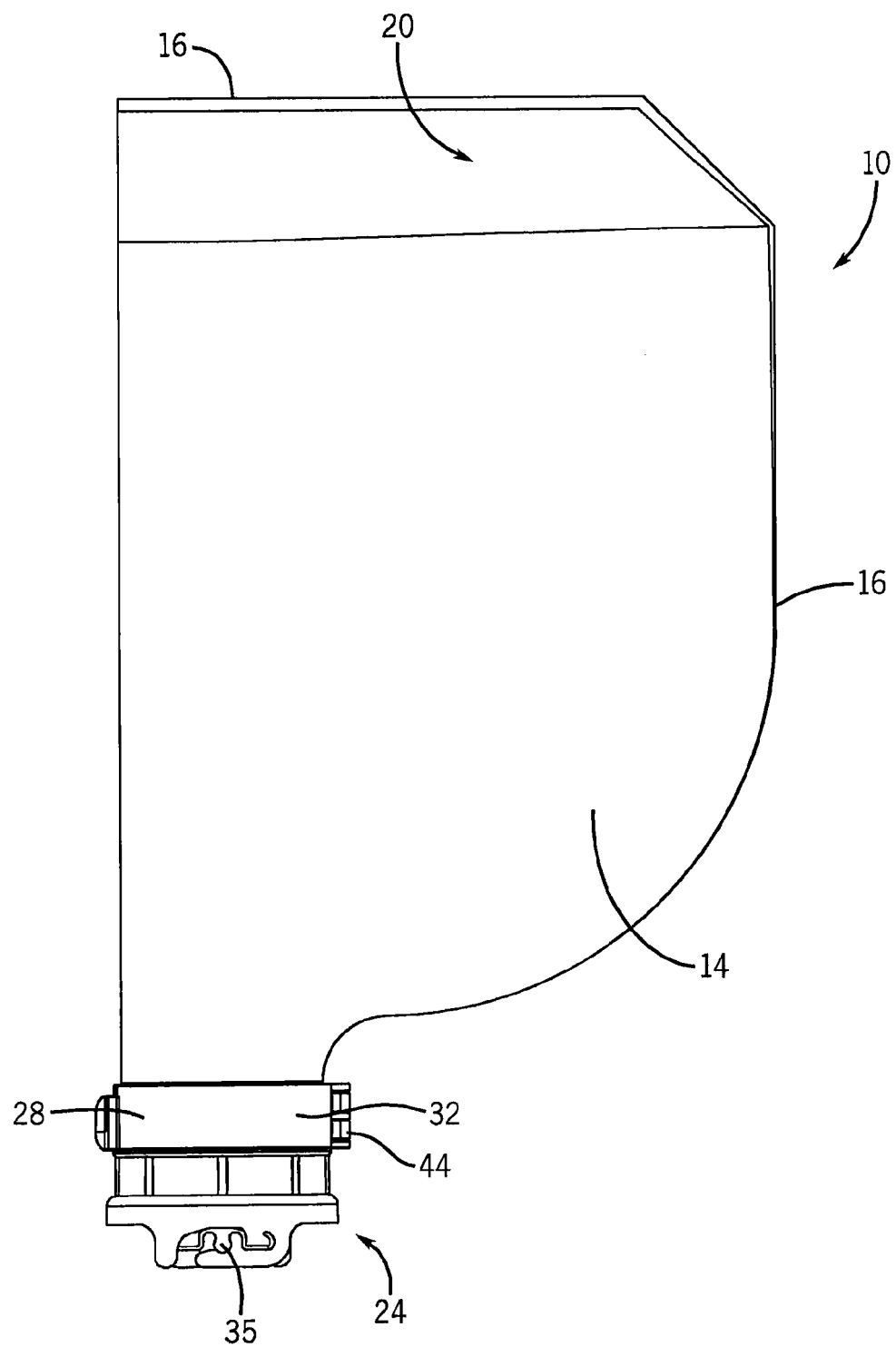
FIG. 1 is a perspective view of a debris bag according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
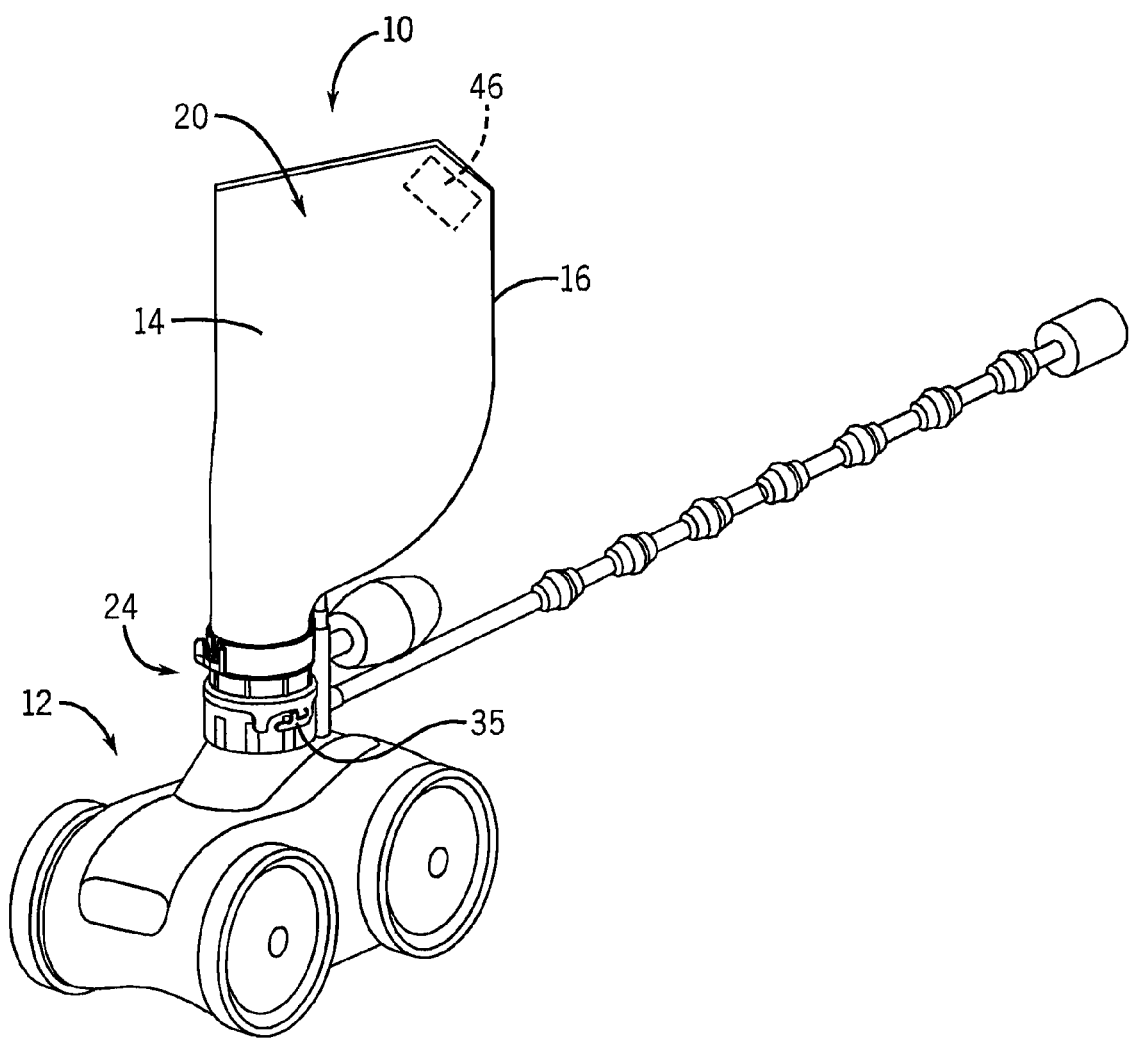
FIG. 2 is perspective view of the debris bag of FIG. 1 coupled to a pool cleaner.

FIG. 1 illustrates a biodegradable, disposable debris bag 10 according to one embodiment of the invention. The debris bag 10 can be coupled to an outlet of a pool cleaner 12, as shown in FIG. 2, to capture debris collected by the pool cleaner 12. The debris bag 10 can be constructed of a biodegradable fabric filtration media 14 and thread 16.

Figure 3:
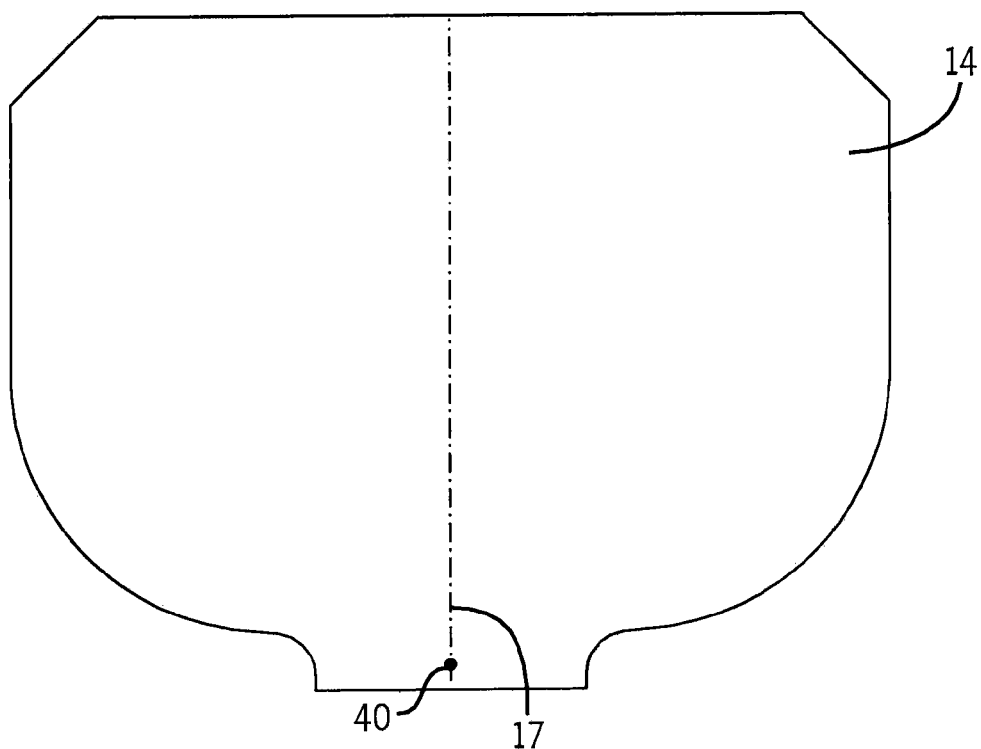
FIG. 3 is front view of the debris bag of FIG. 1 in an unconstructed state.
Figure 4:
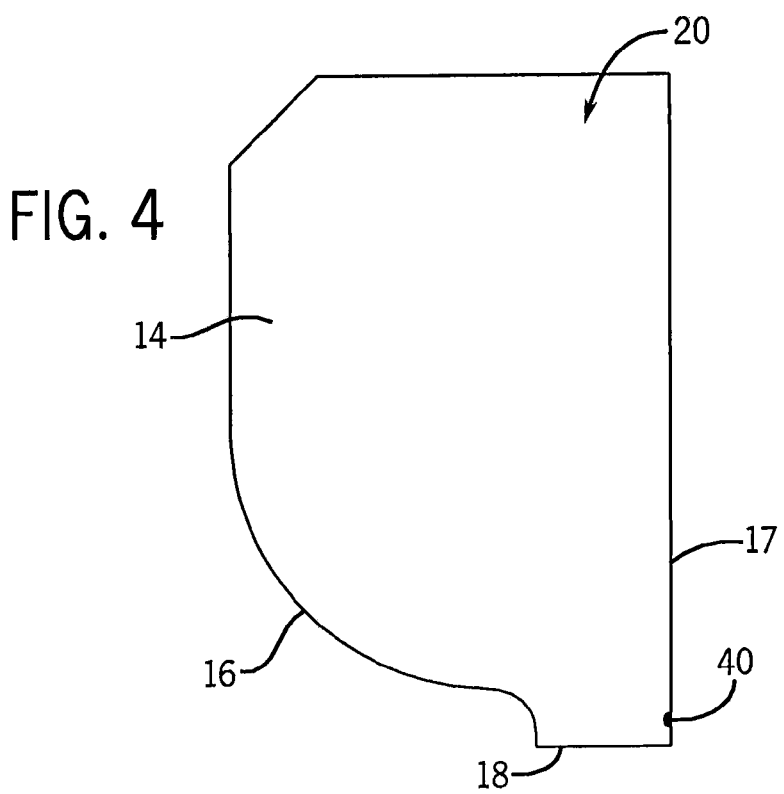
FIG. 4 is a front view of the debris bag of FIG. 1 in a constructed state.

FIGS. 3 and 4 illustrate the debris bag 10 in an unconstructed state and a constructed state, respectively. In some embodiments, as shown in FIG. 3, the debris bag 10 can be constructed of a single piece of biodegradable fabric filtration media 14. The single piece of biodegradable fabric filtration media 14 can be folded over at a fold line 17 and stitched together with the thread 16, as shown in FIG. 4. A portion of the debris bag 10 can remain separated (i.e., not stitched together) to create an opening 18. In one embodiment, the debris bag 10, when laid flat as shown in FIG. 4, can be about 16 inches long. The width of a top portion 20 of the debris bag 10 can be about 10 inches and can taper down toward the opening 18. In some embodiments, the opening 18 can have a diameter of about 5 inches.

As shown in FIGS. 5A and 5B, the debris bag 10 can be stitched together to create a hollow interior portion 22. Edge portions as well as other portions of the debris bag 10 can include stitching in some embodiments. The debris bag 10 can be stitched with the thread 14 using a suitable stitch pattern, such as an overlock stitch pattern. The overlock stitch pattern can be about 5/32 inches in width and can be located on the inside of the debris bag 10 (i.e., within the hollow interior portion 22). In addition, the opening 18 can be reinforced by using the overlock stitch pattern around its circumference. In some embodiments, the thread 16 can be bonded polyester thread.

FIGS. 5A and 5B also illustrate an attachment fixture 24 at the opening 18. The opening 18 can be coupled to and in communication with an outlet of the pool cleaner 12 via the attachment fixture 24 (as shown in FIG. 2). As a result, when debris exits the pool cleaner 12 at its outlet, it can travel through the opening 18 and can be captured inside the hollow interior portion 22. The hollow interior portion 22 can be a single chamber large enough to accommodate debris such as leaves.

FIGS. 6A and 6B illustrate components of the attachment fixture 24. In some embodiments, the attachment fixture 24 can include an inner ring 26 (as shown in FIG. 6A) and an outer ring 28 (as shown in FIG. 6B). The inner ring 26 can be equipped with a flexible sand flap 30 and the outer ring 28 can include a first outer ring half 32 and a second outer ring half 34 hinged together. The attachment fixture 24 can also include hook areas 35 for coupling the attachment fixture 24 to the outlet of the pool cleaner 12. In addition, as shown in FIG. 6A, a support fixture 36 can be coupled to the attachment fixture 24 to support the debris bag 10 in an upright position.

Figure 7A:
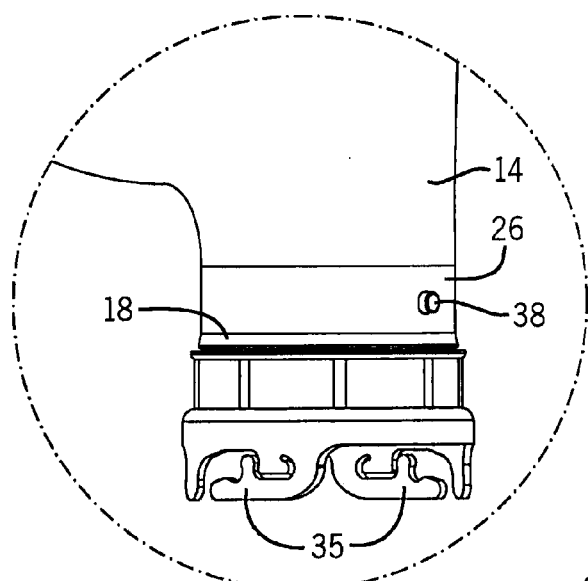
FIGS. 7A-7C are perspective partial views of a sequence illustrating a debris bag being secured to an attachment fixture, according to one embodiment of the invention.
Figure 7B:
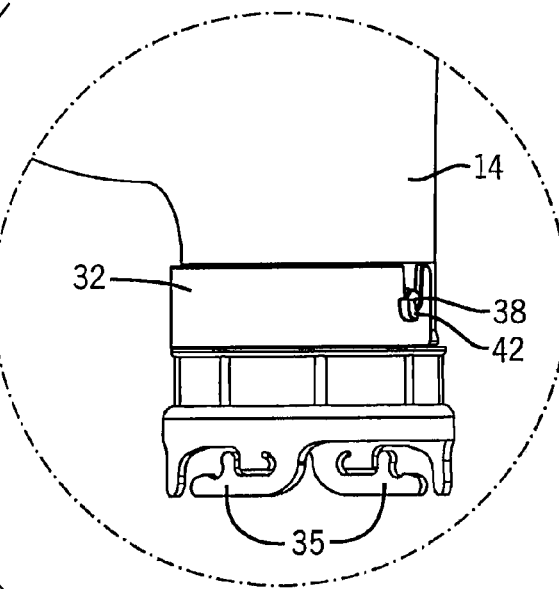
Figure 7C:
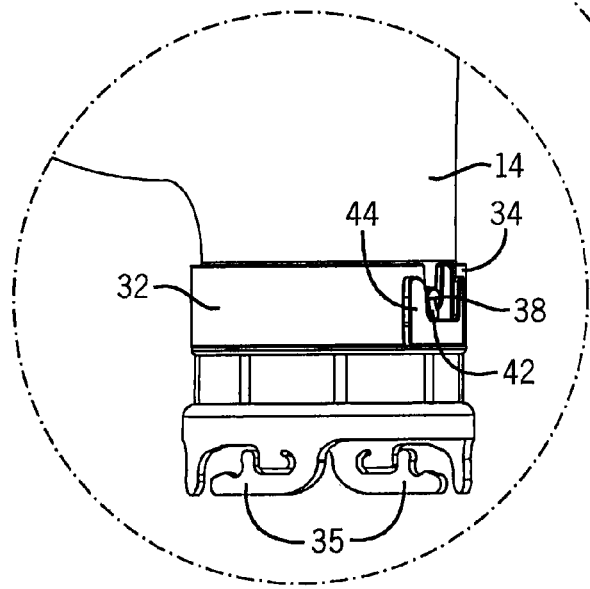

FIGS. 7A-7C illustrate steps for securing the opening 18 to the attachment fixture 24. As shown in FIG. 7A, the opening 18 can fit over the inner ring 26. In one embodiment, the inner ring 26 can include a round pin 38 and the debris bag 10 can include a pin hole 40 (as shown in FIGS. 3 and 4) that fits over the round pin 38 when the opening 18 is slipped over the inner ring 26. The two halves 32, 34 of the outer ring 28 can wrap around the inner ring 26 and snap together to hold the debris bag 10 in place, acting as a bag clamp by pressing the debris bag against the inner ring 26 and the sand flap 30. More specifically, after the debris bag 10 is slipped onto the inner ring 26, the first outer ring half 32 can be hooked around the round pin 38 and wrapped around the inner ring 26, as shown in FIG. 7B. Then, as shown in FIG. 7C, the second outer ring half 34 can wrap around the inner ring 26, over the round pin 38, and snap onto the first outer ring half 32 via, for example, a snap 42 on the first outer ring half 32 and a snap lip 44 on the second outer ring half 34. The round pin 38 and the pin hole 40 can help secure the debris bag 10 in place and can help prevent the debris bag 10 from slipping off the attachment fixture 24 when the outer ring 28 is snapped together. In some embodiments, the biodegradable fabric filtration media 14 at the circumference of the pin hole 40 can be melted for increased strength. To detach the debris bag 10 from attachment fixture 24, the snap lip 44 can be pushed outward and released from the snap 42. The outer ring 28 can then be unwrapped and the debris bag 10 can be slipped off the inner ring 26.

The debris bag 10 can be used with a pressure-side pool cleaner 12, such as a Legend® series pool cleaner, manufactured by Pentair Water Pool and Spa, Inc. Pressure side pool cleaners 12 generally depend on a venturi system to move debris with the help of moving water from the bottom of the pool through a vacuum tube to the outlet and into the debris bag 10. The water can then flow out of the debris bag 10, while the debris remains inside the debris bag 10. Any restriction to the flow generated by venturi system, such as water being restricted from flowing out of the debris bag 10, reduces the speed of water, and thus, reduces the amount of debris pick up. In some embodiments, the biodegradable fabric filtration media 14 can have a permeability (i.e., air permeability) between about 900 cubic feet per minute per square foot ($cfm/ft^2$) and about 1200 $cfm/ft^2$. The permeability of the biodegradable fabric filtration media 14 in some embodiments can permit better (i.e., less inhibited) water flow through the debris bag 10 compared to other disposable debris bags. Due to the higher permeability of the biodegradable fabric filtration media 14, water can move up and through the debris bag 10 with less restriction compared to conventional disposable debris bags, even when there is considerable debris present. Other embodiments can use different types of biodegradable fabric with different permeabilities. In some embodiments, the biodegradable fabric filtration media 14 can be non-woven polylactic acid (PLA) fabric or non-woven polyhydroxy butyrate (PHB) fabric, and can have a thickness between about 0.006 inches and about 0.012 inches.

When the debris bag 10 is full, it can be separated from the pool cleaner 12 and the attachment fixture 24, as described above, and disposed of with the debris. Due to the biodegradable fabric filtration media 14, the entire debris bag 10 can be biodegradable, and thus, not harmful to the environment. In some embodiments, the debris bag 10 can degrade entirely in about five years.

In some embodiments, the pool clearer 12 can include a float 46, as shown in FIG. 2. In some embodiments, the float 46 can be coupled to the top of the debris bag 10, along the inside or outside of the debris bag 10, to keep the debris bag 10 upright and prevent it from affecting the movement of the pool cleaner 12. In one embodiment, the float 46 can be similar to that described in U.S. Pat. No. 6,193,885, the entire contents of which is incorporated herein by reference.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A debris bag for a pool cleaner, the debris bag comprising:
    a single sheet of biodegradable fabric filtration media folded over itself, the biodegradable fabric filtration media including a permeability between about 950 cubic feet per minute per square foot and about 1200 cubic feet per minute per square foot; and
    a thread stitching together the biodegradable fabric filtration media to form a single opening and a hollow interior portion,
    the single opening configured to be coupled to and receive debris from an outlet of the pool cleaner,
    the hollow interior portion configured to capture the debris from the pool cleaner, and
    the single opening configured to be removed from the outlet of the pool cleaner for disposal of the biodegradable fabric filtration media and the debris collected in the hollow interior portion after use of the debris bag.

2. The debris bag of claim 1 wherein the biodegradable fabric filtration media is folded over and stitched together using an overlock stitch pattern to create the single opening and the hollow interior portion.

3. The debris bag of claim 1 wherein the biodegradable fabric filtration media is composed of one of non-woven polylactic acid fabric and non-woven polyhydroxy butyrate fabric.

4. The debris bag of claim 1 and further comprising a float to keep the pool cleaner debris bag upright when in the pool.

5. The debris bag of claim 1 wherein the biodegradable fabric filtration media has a thickness between about 0.006 inches and about 0.012 inches.

6. The debris bag of claim 1 wherein a circumference of the single opening is reinforced using an overlock stitch pattern.

7. The debris bag of claim 1, wherein the thread is a bonded polyester thread.

8. The debris bag of claim 1 wherein the biodegradable fabric filtration media is capable of degrading within about 5 years.

9. The debris bag of claim 2 wherein the overlock stitch pattern has a width of about 5/32 inches.

10. The debris bag of claim 2 wherein the overlock stitch pattern is located inside the hollow interior portion.

11. The debris bag of claim 1 and further comprising an attachment fixture to couple the opening to the outlet of the pool cleaner.

12. The debris bag of claim 11, wherein the single opening is capable of being coupled to the attachment fixture and the attachment fixture is capable of being coupled to the outlet of the pool cleaner.

13. The debris bag of claim 12 wherein the attachment fixture includes an inner ring and an outer ring including a first outer ring half and a second outer ring half.

14. The debris bag of claim 13, wherein the single opening is fit over the inner ring and the first outer ring half and the second outer ring half are wrapped around the inner ring and snapped together in order to couple the opening to the attachment fixture.

15. The debris bag of claim 12, wherein the attachment fixture includes hook areas to couple itself to the outlet of the pool cleaner.

16. The debris bag of claim 13, wherein the inner ring includes a round pin and the single opening includes a pin hole that fits over the round pin when the single opening is fit over the inner ring.

17. The debris bag of claim 16 wherein a circumference around the pin hole is melted biodegradable fabric filtration media.

18. The debris bag of claim 14 wherein the first outer ring half and the second outer ring half are hinged together, and one of the first outer ring half and the second outer ring half includes a snap lip and the other of the first outer ring half and the second outer ring half includes a snap to engage the snap lip in order to snap the first outer ring half and the second outer ring half together.

19. The debris bag of claim 11 wherein the attachment fixture includes a support fixture to support the debris bag in an upright position when the single opening is coupled to the outlet of the pool cleaner.

* * * * *